(12) United States Patent
Ramseyer et al.

(10) Patent No.: US 11,428,578 B2
(45) Date of Patent: Aug. 30, 2022

(54) SENSOR ASSEMBLY (71) Applicant: Endress+Hauser Flowtec AG, Reinach (CH)

(72) Inventors: Severin Ramseyer, Münchenstein (CH); Benjamin Schwenter, Aesch (CH)

(73) Assignee: ENDRESS+HAUSER FLOWTEC AG, Reinach (CH)

(*) Notice: Subject to any disclaimer, the term of this patent is extended or adjusted under 35 U.S.C. 154(b) by 299 days.

(21) Appl. No.: 16/637,572

(22) PCT Filed: Jul. 12, 2018

(86) PCT No.: PCT/EP2018/068898
§ 371 (c)(1),
(2) Date: Feb. 7, 2020

(87) PCT Pub. No.: WO2019/029942
PCT Pub. Date: Feb. 14, 2019

(65) Prior Publication Data
US 2020/0256738 A1    Aug. 13, 2020

(30) Foreign Application Priority Data
Aug. 9, 2017   (DE) .................. 10 2017 118 109.1

(51) Int. Cl.
*G01K 1/14*   (2021.01)
*G01K 7/02*   (2021.01)
(Continued)

(52) U.S. Cl.
CPC .............. *G01K 1/14* (2013.01); *G01K 1/143* (2013.01); *G01K 1/16* (2013.01); *G01K 7/02* (2013.01);
(Continued)

(58) Field of Classification Search
CPC ........... G01K 1/14; G01K 1/143; G01K 1/16; G01K 7/02; G01K 7/18; G01K 7/22; G01K 13/02; G01K 13/024; G01K 13/026
See application file for complete search history.

(56) References Cited

U.S. PATENT DOCUMENTS 4,768,384 A * 9/1988 Flecken ................ G01F 1/8495
73/861.02
5,381,697 A * 1/1995 van der Pol .......... G01F 1/8409
73/861.356
(Continued)

FOREIGN PATENT DOCUMENTS

CN          1444235 A    9/2003
CN        102348961 A    2/2012
(Continued)

OTHER PUBLICATIONS

"Electrromechanical Dictionary", Dec. 31, 1991, Edited by Shanghai Jiao Tong University, Inertia Moment, p. 986, 1-44.
(Continued)

*Primary Examiner* — Nathaniel T Woodward
*Assistant Examiner* — Philip L Cotey
(74) *Attorney, Agent, or Firm* — Kelly J. Smith; Endress+Hauser (USA) Holding Inc.

(57) ABSTRACT

The sensor assembly of the present disclosure comprises a temperature detector and a support element having a middle segment, a first end segment and a second end segment. A coupling body couples the temperature detector thermally conductively with the support element. The temperature detector and coupling body are connected by material bonding and arranged on a first surface of the support element. The coupling body is connected with the support element by material bonding to form a coupling body to support element connection zone. Additionally, a smallest bending stiffness, which the middle segment has in the region of the coupling
(Continued)

body to support element connection zone, is greater than a smallest bending stiffness, which the support element has, as a whole, and/or greater than a smallest bending stiffness, which the first end segment has, and/or greater than a smallest bending stiffness, which the second end segment has.

24 Claims, 6 Drawing Sheets

(51) Int. Cl.
    *G01K 7/18*     (2006.01)
    *G01K 7/22*     (2006.01)
    *G01K 13/02*     (2021.01)
    *G01K 1/143*     (2021.01)
    *G01K 1/16*     (2006.01)
    *G01K 13/024*     (2021.01)

(52) U.S. Cl.
    CPC ............ *G01K 7/18* (2013.01); *G01K 7/22* (2013.01); *G01K 13/02* (2013.01); *G01K 13/024* (2021.01); *G01K 13/026* (2021.01)

(56) References Cited

U.S. PATENT DOCUMENTS

| | | | | |
|---|---|---|---|---|
| 6,550,962 | B1* | 4/2003 | Yang ................ | F16L 3/04 |
| | | | | 24/458 |
| 7,549,319 | B2* | 6/2009 | Headrick ............ | G01N 9/002 |
| | | | | 73/32 A |
| 2004/0028118 | A1* | 2/2004 | Sidoni ............... | G01K 1/143 |
| | | | | 374/208 |
| 2004/0187599 | A1* | 9/2004 | Drahm ............... | G01F 1/8436 |
| | | | | 73/861.357 |
| 2009/0190630 | A1* | 7/2009 | Hong ................. | G01K 1/143 |
| | | | | 374/208 |
| 2011/0113896 | A1* | 5/2011 | Drahm ............... | G01F 1/8477 |
| | | | | 73/861.357 |
| 2013/0028555 | A1* | 1/2013 | Dailey ............... | G01K 11/32 |
| | | | | 385/12 |
| 2014/0069210 | A1* | 3/2014 | Hussain ............. | G01F 1/8436 |
| | | | | 73/861.357 |
| 2014/0161151 | A1* | 6/2014 | Proctor ............... | G01K 1/143 |
| | | | | 374/147 |
| 2016/0138952 | A1* | 5/2016 | Wang ................ | G01K 1/143 |
| | | | | 73/204.25 |
| 2016/0273969 | A1* | 9/2016 | Lesage ............... | F24H 9/2014 |
| 2017/0074701 | A1* | 3/2017 | Rieder ............... | G01N 9/002 |

FOREIGN PATENT DOCUMENTS

| | | |
|---|---|---|
| CN | 103733031 A | 4/2014 |
| CN | 204373800 U | 6/2015 |
| CN | 104748803 A | 7/2015 |
| CN | 205120268 U | 3/2016 |
| DE | 19740724 A1 | 6/1998 |
| DE | 102012204898 A1 | 10/2013 |
| EP | 0919793 A2 | 6/1999 |
| EP | 1801548 A2 | 6/2007 |
| WO | 0102816 A2 | 1/2001 |
| WO | 2009016013 A1 | 2/2009 |
| WO | 2009134268 A1 | 11/2009 |
| WO | 2012033504 A1 | 3/2012 |
| WO | 2012067608 A1 | 5/2012 |
| WO | 2012115639 A1 | 8/2012 |
| WO | 2017036760 A1 | 3/2017 |

OTHER PUBLICATIONS

"Concise Internal Spinal Fixation Profile",Dec. 31, 2014, Edited by Fengzeng Jian, Elasticity Modulus, Section Modulus and Inertia Moment, p. 11, 1-44.

* cited by examiner

SENSOR ASSEMBLY

CROSS-REFERENCE TO RELATED APPLICATIONS

The present application is related to and claims the priority benefit of German Patent Application No. 10 2017 118 109.1, filed Aug. 9, 2017, and International Patent Application No. PCT/EP2018/068898 filed on Jul. 12, 2018, the entire contents of which are incorporated herein by reference.

TECHNICAL FIELD

The invention relates to a sensor assembly including a temperature detector as well as to a transducer apparatus having such a sensor assembly and a tube connected therewith. Furthermore, the invention relates also to a measuring system formed by means of such a transducer apparatus as well as to a production process for such a transducer apparatus.

BACKGROUND

Transducer apparatuses of the aforementioned type, or measuring systems formed therewith, are disclosed in EP-A 919 793, US-A 2004/0187599, US-A 2011/0113896, US-A 2014/0069210, US-A 2016/0138952, US-A 2017/0074701, U.S. Pat. Nos. 4,768,384, 5,381,697, 7,549,319, WO-A 01/02816, WO-A 2009/134268, WO-A 2012/033504, WO-A 2012/067608 or WO-A 2012/115639. As shown in these, such transducer apparatuses can comprise: at least one tube having a lumen surrounded by a wall, typically of metal, especially a lumen serving for conveying a flowing fluid; as well as a temperature sensor applied externally on the tube and thermally conductively connected therewith. The tube of the above described transducer apparatuses can, additionally, especially be adapted to convey a fluid, for example, a gas, a liquid or a flowable dispersion, flowing, at least at times, in its lumen and during that to be caused to vibrate. The temperature sensor is, in turn, adapted to register a temperature of the wall of the tube and to transduce such into a corresponding electrical temperature measurement signal, namely a temperature measurement signal representing the above-mentioned temperature. The transducer apparatus, especially its temperature sensor, can, furthermore, be connected to a measuring- and operating-electronics, for example, one formed by means of at least one microprocessor, to form a measuring system serving for measuring at least one measured variable, for example, a temperature, a mass flow rate, a density and/or a viscosity, of the fluid conveyed in the at least one tube of the transducer apparatus.

The above-mentioned temperature sensor is typically formed by means of at least one temperature detector as well as a coupling body connecting the temperature detector mechanically, equally as well, thermally conductively, with the wall of the tube. Such temperature detectors can be formed, for example, by means of a temperature sensitive measuring resistor, for example, a platinum-measuring resistor, such as, for instance, a Pt100, a Pt500 or a Pt1000, a thermistor or a thermocouple. The principles of construction and application of such platinum-measuring resistors are known to those skilled in the art and explained, for instance, in EP-A 01801548, WO-A 2009/016013 and WO-A 2017/036760 A1. The coupling body can, in turn, be, for example, a formed part of metal or plastic and/or result directly from the application of the temperature detector onto the tube by means of thermally conductive adhesive or by means of solder.

As discussed in, among others, the above referenced US-A 2016/0138952, there can, in the case of transducer apparatuses of the above-described type, or measuring systems formed therewith, not least of all also in the case of transducer apparatuses with vibrating tube, or vibronic measuring systems formed therewith, be an increased risk, for instance, that the connection between the wall of the tube and the temperature sensor—, for example, as a result of material changes and/or excess mechanical stress and/or a too high operating temperature—is not durable, or becomes damaged, in such a manner that the dependence of the temperature measurement signal generated therewith on the temperature to be registered for the wall basically changes over time and/or that the temperature sensor separates from the wall; this, especially, in the case of applications where the temperature of the wall is very high, very low and/or changes very rapidly, in given cases, even abrupty.

In the case of the transducer apparatus disclosed in US-A 2016/0138952, the temperature sensor includes, consequently, for enabling its safe and reliable securement on the wall, an additional retaining bracket, which at least partially surrounds the temperature detector together with the coupling body (in such case referred to as fixing element) and which is connected with the wall by material bonding, for example, as a result of soldering, welding or adhesive. A disadvantage of this solution is, among others, however, that the final finishing of the in any event relatively complicated to manufacture temperature sensor is completed insitu, namely in the final, installed position on the tube, in that the retaining bracket is, firstly, accurately fitted on the temperature detector already applied on the tube together with the coupling body and, thereafter, while maintaining position of all components of the temperature sensor, connected with the wall of the tube. Associated therewith, the effort to assemble the temperature sensor, and the transducer apparatus formed therewith, as well as also the demands placed on the personnel performing the assembly, increase significantly; this not least of all because not only the temperature detector together with the coupling body must be positioned, formed and secured, typically manually, very precisely on the wall of the tube, but, also, because thereafter, additionally, also the retaining bracket, fitted to the assembly formed on the tube, firstly, by temperature detector and coupling body, must be correspondingly precisely preformed and, likewise manually, be positioned on the tube and secured thereto. Moreover, the so produced temperature sensor can, not least of all due to the relatively large amount of manually performed tasks, require a corresponding complex subsequent quality checking.

SUMMARY

Starting from the above described state of the art, an object of the invention is, consequently, so to improve temperature sensors of the above-described type that, on the one hand, their final mounting on the tube is simplified and, on the other hand, the so produced temperature sensors, and the transducer apparatuses formed therewith, exhibit a high, long term durability, thus a high, long term stability can be assured. Especially, application of the temperature sensor, and the transducer apparatus formed therewith, should also additionally be enabled for operating temperatures above 350° C.

For achieving the object, the invention resides in a sensor assembly, comprising:
- a temperature detector, for example, a temperature detector produced in thin film technology, or formed by means of at least one platinum-measuring resistor;
- a metal, support element, for example, a monolithic, metal, support element, for holding the temperature detector and having a middle segment, for example, a plate-shaped, middle segment, a first end segment, for example, a plate-shaped, first end segment, adjoining a first end of the middle segment, and a second end segment, for example, a plate-shaped, second end segment, adjoining a second end of the middle segment remote from the first end; as well as
- a coupling body, for example, a coupling body at least partially surrounding the temperature detector and/or a metal coupling body, coupling the temperature detector thermally conductively with the support element;
- wherein the temperature detector and the coupling body are connected together by material bonding and are arranged together on a first surface of the support element; and
- wherein the coupling body is connected with the support element, for example, with the middle segment of the support element, by material bonding to form a coupling body to support element, connection zone; and
- wherein a smallest bending stiffness, which the middle segment has at least in the region of the coupling body to support element, connection zone, is greater than a smallest bending stiffness, which the support element has as a whole, and/or greater than a smallest bending stiffness, which the first end segment has, and/or greater than a smallest bending stiffness, which the second end segment has.

Furthermore, the invention resides in a transducer apparatus formed by means of such a sensor assembly and, additionally, comprising a tube having a lumen surrounded by a wall, for example, a metal wall, for example, a tube, which is hollow cylindrical, at least in certain regions, and/or curved, at least in certain regions, wherein the support element, for example, a clamp like support element, of the sensor assembly is arranged on the lumen-far surface of the wall of the tube and connected with the wall by material bonding—for example, welded and/or soldered thereto.

Moreover, the invention resides in a measuring system formed by means of such a transducer apparatus for measuring at least one measured variable, for example, a temperature, a density and/or a viscosity, of a flowing fluid, for example, a gas, a liquid or a flowable dispersion, which measuring system additionally comprises a measuring- and operating electronics electrically connected with the temperature detector and formed, for example, by means of a microprocessor.

Additionally, the invention resides also in a method for producing of the above described transducer apparatus, wherein the method comprises steps as follows:
- providing the sensor assembly;
- providing the tube;
- applying the first end segment of the support element on the wall of the tube
- material bonded connecting of the first end segment of the support element with the wall of the tube, for example, by means of resistance welding;
- applying the second end segment of the support element on the wall of the tube; as well as
- material bonded connecting of the second end segment of the support element with the wall of the tube, for example, by means of resistance welding.

In a first embodiment of the sensor assembly of the invention, it is provided that the first end segment is adapted to be plastically deformed, for example, bent, as a result of a bending force introduced therein away from the middle segment.

In a second embodiment of the sensor assembly of the invention, it is provided that the second end segment is adapted to be plastically deformed, for example, bent, as a result of a bending force introduced therein away from the middle segment.

In a third embodiment of the sensor assembly of the invention, it is provided that the middle segment is adapted not to be plastically deformed as a result of a bending force introduced into the first end segment and plastically deforming the first end segment and/or as a result of a bending force introduced into the second end segment and plastically deforming the second end segment.

In a fourth embodiment of the sensor assembly of the invention, it is provided that the first end segment and the second end segment are adapted, as a result of a bending force introduced therein, in each case, away from the middle segment, to be deformed, for example, plastically deformed, for example, bent; this, for example, also in such a manner that both the first end segment and the middle segment as well as also the second end segment and the middle segment enclose, in each case, an angle, for example, an equally sized angle, of less than 180° and greater than 90° and/or that the first surface is convex within a region extending from the first end segment to the second end segment.

In a fifth embodiment of the sensor assembly of the invention, it is provided that the support element is composed, at least partially, for example, predominantly or completely, of a stainless steel, for example, an austenitic stainless steel.

In a sixth embodiment of the sensor assembly of the invention, it is provided that the temperature detector comprises a support, for example, of a glass and/or a ceramic, as well as at least one conductive trace, for example, of platinum, arranged on the support, for example, a conductive trace applied in thin film technology and/or at least sectionally meander-shaped. Developing this embodiment of the invention, it is, furthermore, provided that the temperature detector has a protective cover layer at least partially covering at least the conductive trace, for example, a protective cover layer at least partially composed of a lead free glass and/or a glass conforming to EU-Directive 2011/65/EU (ROHS 2), and/or that the temperature detector has a metallized layer, for example, a metallized layer applied in thin film technology, on a side of the support not supporting the at least one conductive trace, for example, the side opposite the conductive trace.

In a seventh embodiment of the sensor assembly of the invention, the temperature detector is adapted to register a temperature at a temperature measurement location formed therewith and to transduce such into a temperature measurement signal, namely an electrical measurement signal representing the measurement location temperature, for example, an electrical measurement signal having an electrical signal voltage dependent on the first measurement location temperature and/or an electrical signal current dependent om the first measurement location temperature.

In an eighth embodiment of the sensor assembly of the invention, it is provided that the temperature detector is formed by means of a platinum measuring resistor.

In a ninth embodiment of the sensor assembly of the invention, it is provided that the temperature detector is formed by means of a thermistor.

In a tenth embodiment of the sensor assembly of the invention, it is provided that the temperature detector is formed by means of a thermocouple.

In a first embodiment of the sensor assembly of the invention, such further comprises, electrically connected with the temperature detector, a pair of connection wires, for example, connection wires in the form of copper-wires and/or silver-wires. Moreover, the sensor assembly can, furthermore, comprise a protective cover layer at least partially covering both the temperature detector as well as also the pair of connection wires, for example, within a shared contact region, for example, a protective cover layer at least partially composed of a plastic, for example, a silicone and/or an epoxide resin.

In a second embodiment of the sensor assembly of the invention, such further comprises a retaining bracket, for example, a retaining bracket of a metal, connected by material bonding with the support element, for example, with the middle segment of the support element, wherein the retaining bracket surrounds the temperature detector and, for example, holds the temperature detector pressed against the support element.

In a first embodiment of the transducer apparatus of the invention, the tube is adapted to convey a fluid, for example, a gas, a liquid or a flowable dispersion, flowing at least at times in its lumen.

In a second embodiment of the transducer apparatus of the invention, the tube is adapted to convey a fluid, for example, a gas, a liquid or a flowable dispersion, flowing at least at times in its lumen and during that to be caused to vibrate.

In a third embodiment of the transducer apparatus of the invention, it is provided that the support element of the sensor assembly contacts the wall of the tube, at least in certain regions, with a second surface, for example, a planar, second surface, opposite the first surface of the support element. Developing this embodiment of the invention further, it is, furthermore, provided that the second surface of the support element is concave within a region extending from its first end segment to its second end segment.

In a fourth embodiment of the transducer apparatus of the invention, it is provided that both the first end segment and the middle segment of the support element as well as also the second end segment and the middle segment of the support element enclose, in each case, a, for example, equally large, angle of less than 180° and greater than 90°.

In a fifth embodiment of the transducer apparatus of the invention, it is provided that the first surface of the support element is convex within a region extending from its first end segment to its second end segment.

In a sixth embodiment of the transducer apparatus of the invention, it is provided that the support element is arranged on a hollow cylindrical segment of the wall.

In a seventh embodiment of the transducer apparatus of the invention, it is provided that the support element, for example, its middle segment and/or its first end segment and/or its second end segment, contacts the wall of the tube.

In an eighth embodiment of the transducer apparatus of the invention, it is provided that the wall of the tube is composed, at least partially, for example, predominantly or completely, of a stainless steel, for example, an austenitic stainless steel.

In a ninth embodiment of the transducer apparatus of the invention, it is provided that the support element and the wall of the tube are composed, at least partially, for example, predominantly or completely, of equal materials.

In a tenth embodiment of the transducer apparatus of the invention, it is provided that the first end segment of the support element and the wall of the tube are welded together, for example, by means of resistance welding.

In an eleventh embodiment of the transducer apparatus of the invention, it is provided that the second end segment of the support element and the wall of the tube are welded together, for example, by means of resistance welding In a twelfth embodiment of the transducer apparatus of the invention, it is provided that the support element is embodied clamp like.

In a thirteenth embodiment of the transducer apparatus of the invention, it is provided that the first surface of the support element is planar, at least in the region of the coupling body to support element, connection zone.

In a fourteenth embodiment of the transducer apparatus of the invention, it is provided that the middle segment of the support element contacts the wall of the tube in the region of the coupling body to support element, connection zone.

In a fifteenth embodiment of the transducer apparatus of the invention, it is provided that the middle segment of the support element contacts the wall of the tube only tangentially.

In a sixteenth embodiment of the transducer apparatus of the invention, it is provided that the first end segment of the support element contacts the wall of the tube 2-dimensionally.

In a seventeenth embodiment of the transducer apparatus of the invention, it is provided that the second end segment of the support element contacts the wall of the tube 2-dimensionally.

In an eighteenth embodiment of the transducer apparatus of the invention, it is provided that the middle segment of the support element contacts the wall of the tube to form a middle segment to tube, contact zone.

In a nineteenth embodiment of the transducer apparatus of the invention, it is provided that a heat conductive paste and/or a thermally conductive adhesive are/is applied at least between the middle segment of the support element and the wall of the tube.

In a twentieth embodiment of the transducer apparatus of the invention, it is provided that the middle segment of the support element and the wall of the tube are soldered together.

In a twenty-first embodiment of the transducer apparatus of the invention, it is provided that only the first and second end segments of the support element, not, however, its middle segment, are connected with the wall of the tube by material bonding.

In a twenty-second embodiment of the transducer apparatus of the invention, it is provided that the middle segment of the support element is not connected with the wall of the tube by material bonding.

A basic idea of the invention is to provide an as simple as possible and well reproducibly applied, equally as well, durable temperature sensor, by forming, firstly, a prefabricated sensor assembly, namely a sensor assembly containing both the temperature detector and the coupling body as well as also a temperature detector and a coupling body supporting, supplemental support element, which sensor assembly can thereafter be connected with the wall of the tube comparatively simply, equally as well, well reproducibly and extremely vibration resistantly by material bonding, wherein a middle segment of the support element supporting the temperature detector and the coupling body is embodied relatively rigidly in comparison with end segments of the support element adjoining the middle segment, in order to keep increased mechanical stresses possibly occurring in the tube and/or the sensor assembly durably away from the temperature detector and the coupling body.

The above-mentioned, material bonded connection between sensor assembly and tube can occur advantageously—at least for the case, in which both the wall of the tube as well as also the support element are of a steel, for example, a stainless steel—, for example, exclusively by resistance welding, especially spot welding, of the end segments to the wall. Additionally, the connection can advantageously, predominantly or exclusively, be produced via the end segments of the support element.

A further advantage of the invention is that the sensor assemblies can be prefabricated and later connected to form a transducer apparatus. The prefabrication can be done with machinery, in given cases, also automatically, consequently very well reproducibly and in greater piece numbers. As a result of this, the sensor assemblies of the invention, and the transducer apparatuses formed therewith, can have, in comparison with conventional transducer apparatuses, very low tolerances, namely very low deviations from a corresponding nominal dimension. Moreover, the sensor assembly of the invention is directly fittable to the outer diameter of the tube, and a sensor assembly of the invention produced with a certain structural size can be used for any tube having an outer diameter lying within a predetermined size range extending over a number of centimeters.

A further advantage of the invention is that, due to the above described prefabrication of the temperature sensor, and its significantly simplified, final mounting on the tube, a temperature response behavior of the transducer apparatus of the invention is also very well reproducible over a large number of such transducer apparatuses. For instance, transducer apparatuses produced in series production, or in almost series production, can exhibit, in this regard, a significantly lesser variation among one another in comparison with conventional transducer apparatuses of the above mentioned type. Although this advantage can, as a function of structure, be to the detriment of a thermal resistance, or thermal conductance, established between tube and temperature sensor, nevertheless a transducer apparatus of the invention can, as a result, exhibit in comparison to conventional transducer apparatuses a significantly improved long term stability of the temperature sensor, and a measuring system formed therewith can exhibit for temperature measurement a significantly lessened drift, consequently increased accuracy of measurement, in comparison with conventional measuring systems of the type being discussed.

BRIEF DESCRIPTION OF THE DRAWINGS

The invention as well as advantageous embodiments thereof will now be explained in greater detail based on examples of embodiments shown in the figures of the drawing. Same, or equally acting or equally functioning, parts are provided in all figures with equal reference characters; when perspicuity requires or it otherwise appears sensible, reference characters already shown in earlier figures are omitted in subsequent figures. Other advantageous embodiments or further developments, especially also combinations of, firstly, only individually explained aspects of the invention, result, furthermore, from the figures of the drawing and/or from claims per se.

The figures of the drawing show as follows.

DETAILED DESCRIPTION

Figure 1A:
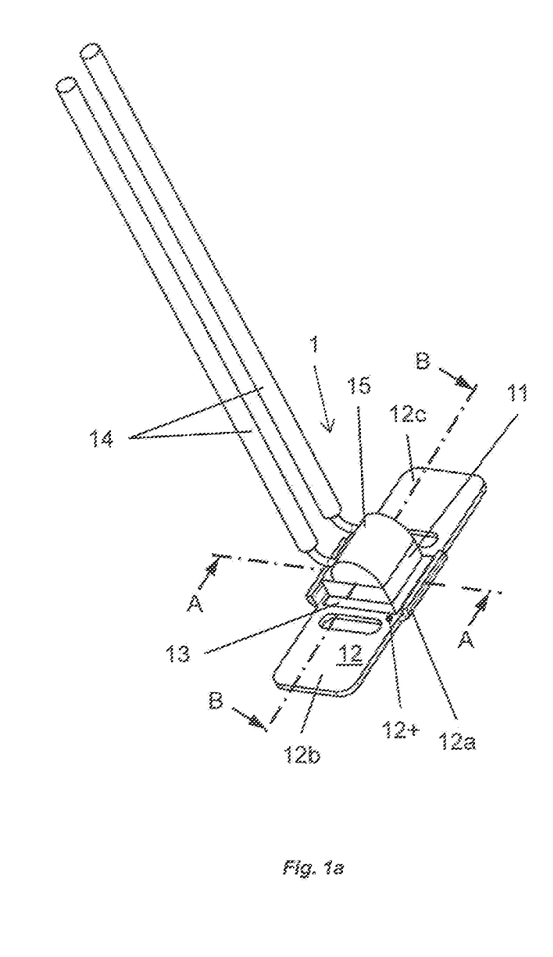
FIG. 1a shows in a perspective side view, an example of an embodiment for a sensor assembly of the present disclosure.
Figure 1B:
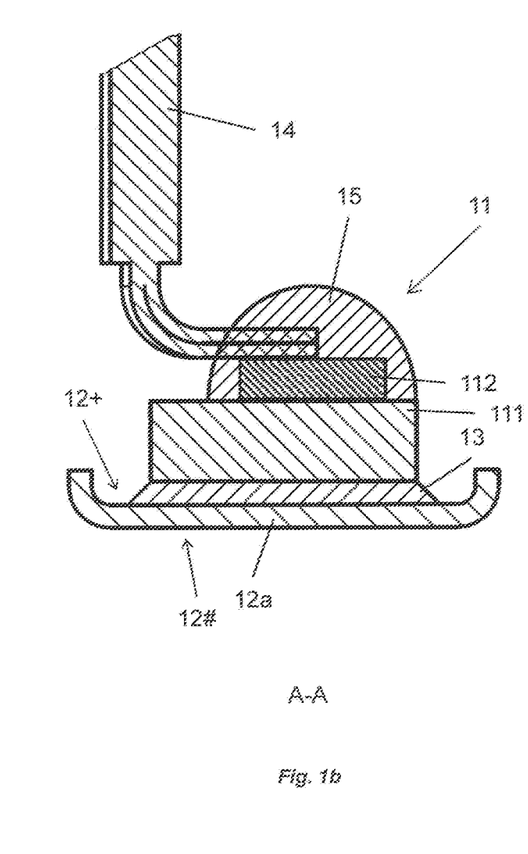
FIG. 1b shows a sensor assembly of the present disclosure in a sectioned, side view.
Figure 2:
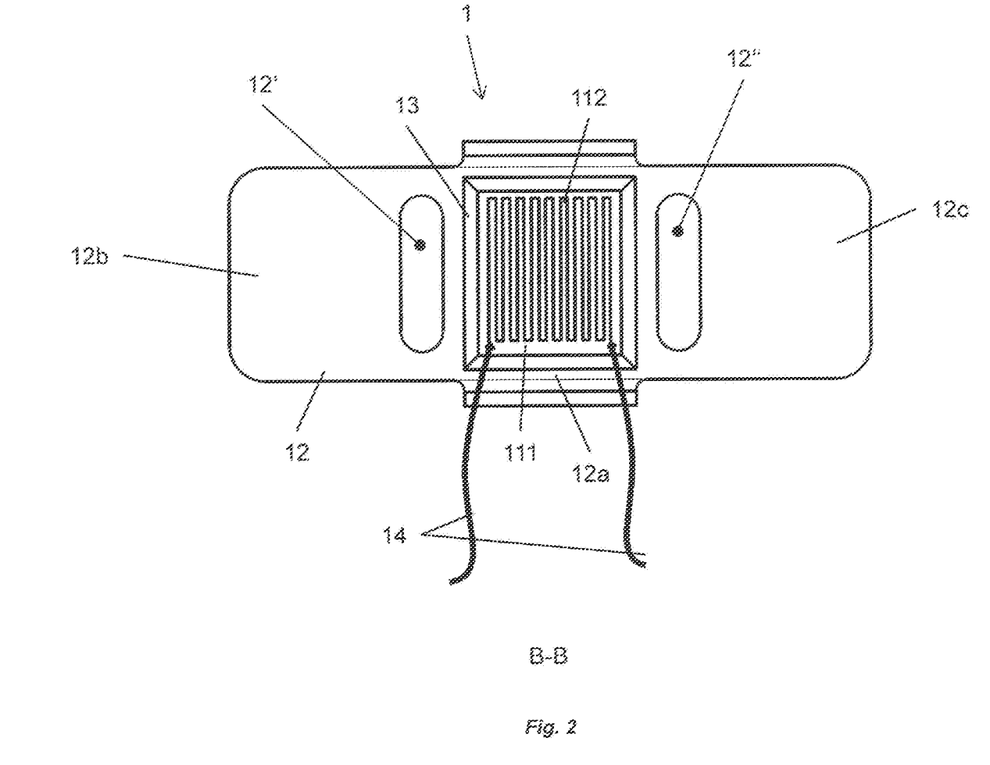
FIG. 2 shows a sensor assembly of the present disclosure in a second, sectioned, side view.
Figure 3A:
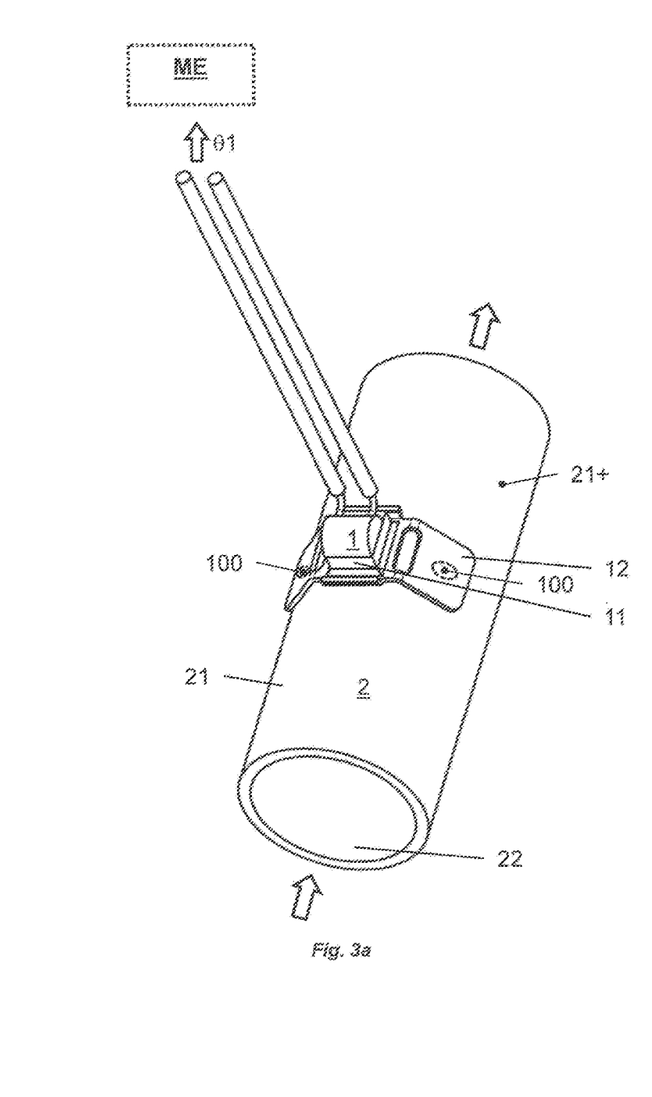
FIG. 3a shows in a perspective, side view, an example of an embodiment for a transducer apparatus of the present disclosure.
Figure 3B:
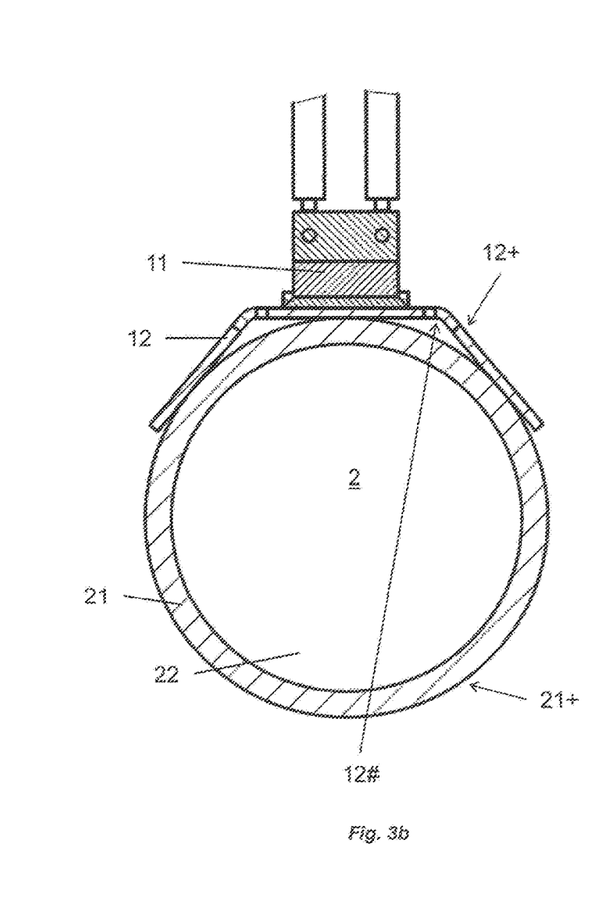
FIG. 3b shows a transducer apparatus of the present disclosure in a sectioned, side view.

Shown in FIGS. 1a, 1b and 2 in different side views is an example of an embodiment for a sensor assembly 1 of the invention—shown here in an original—or starting form. The sensor assembly 1 is, as shown in FIGS. 3a and 3b, especially provided and adapted to form a transducer apparatus serving for the measurement of at least one measured variable, for example, a temperature, a density and/or a viscosity, of a flowing fluid. For this purpose, sensor assembly 1 is placed on, and connected with, a wall of a tube 2, for example, a tube insertable into the course of a pipeline by means of flange connections with fluid supplying and draining segments of the pipeline. The fluid can be, for example, a gas, a liquid or a flowable dispersion. The sensor assembly 1 of the invention, and the transducer apparatus formed therewith, can, additionally, together with a, measuring- and operating electronics ME, formed, for example, by means of a microprocessor, be a component of a measuring system, for example, a vibronic measuring system, serving for measuring the above described, at least one measured variable.

Sensor assembly 1 comprises a temperature detector 11, a support element 12 for holding the temperature detector 11 as well as a coupling body 13 coupling the temperature detector 11 thermally conductively with the support element 12. Temperature detector 11 and the coupling body 13 can advantageously be connected together by material bonding. Temperature detector 11 is, according to an additional embodiment, adapted to register a temperature at a temperature measurement location formed therewith and to transduce such into a temperature measurement signal $\theta1$, namely an electrical measurement signal representing the measurement location temperature $\theta1$, for example, with an electrical signal voltage dependent on the first measurement location temperature and/or an electrical signal current dependent on the first measurement location temperature. Temperature detector 11 of the sensor assembly of the invention can be formed, for example, by means of a temperature sensitive measuring resistor, for example, a platinum-measuring resistor, such as, for instance, a Pt100, a Pt500 or a Pt1000. Alternatively or supplementally, the temperature detector can be formed by means of a thermistor and/or a thermocouple.

Figure 4A:
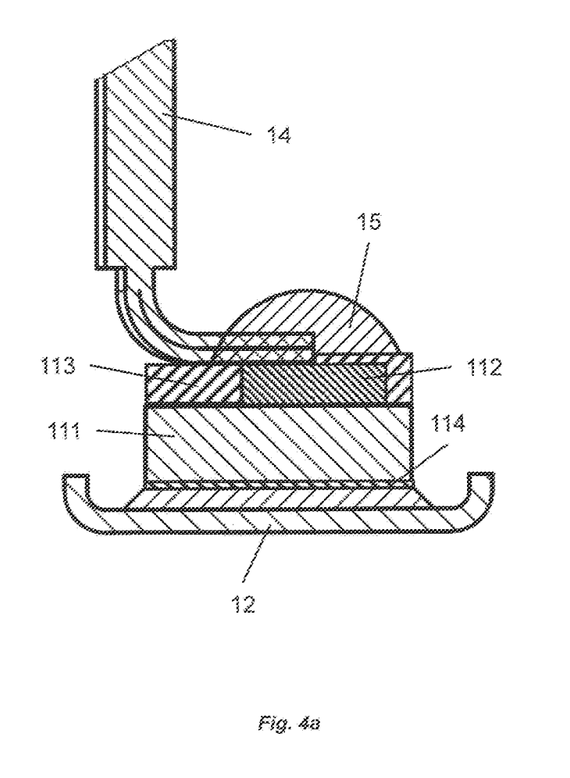
FIG. 4a shows in a sectioned, side view, another example of an embodiment for a sensor assembly of the present disclosure.

Advantageously, the temperature detector can be a temperature detector produced in thin film technology, for example, a platinum-measuring resistor produced in thin film technology, such as that available from the firm, Innovative Sensor Technology IST AG, Ebnat-Kappel, CH, under the designation P0K1.520.4W.B.010. In accordance therewith, the temperature detector 11 comprises, according to an additional embodiment of the invention, a support 111, for example, of a glass and/or a ceramic, as well as at least one conductive trace 112, e.g. of platinum, arranged on the support 111, for example, a conductive trace applied in thin film technology, and/or—, as well as also indicated in FIG. 2—a conductive trace at least sectionally having a meander-shape. For preventing possible damaging of the conductive trace 112, the temperature detector 11 can, furthermore, as well as also indicated in FIGS. 1a and 1b, and evident from their combination, have a protective cover layer 113 at least partially covering at least the conductive trace 12. The protective cover layer 113 can be composed, for example, at least partially, of a glass, especially a lead free glass and/or one conforming to EU-Directive 2011/65/EU (ROHS 2). Alternatively or supplementally, a metallized layer 114 can be provided on a side of the support 111 not supporting the at least one conductive trace 112, for example,—, as well as also in FIG. 4a indicated—on a side of the support 111 opposite the conductive trace. The metallized layer 114—, for example, one applied in thin film technology—can, for the above described case, in which the support 111 is composed of ceramic or glass and the support element is a metal, serve for enabling soldering of the temperature detector 11 to a metal body.

Support element 12 of the sensor assembly 1 of the invention includes a middle segment 12a, a first end segment 12b adjoining a first end of the middle segment 12a as well as a second end segment 12c adjoining a second end of the middle segment 12a remote from the first end. Each of the above described segments 12a, 12b, 12c of the support element 12 can—as shown in FIG. 1a, or directly evident from a combination of FIGS. 1a, 1b and 2—be plate shaped. Support element 12 can be embodied, for example, of a metal, especially a steel, and/or monolithically, for example, produced as a blanked,-stamped-part. In an embodiment of the invention, the support element 12 is composed at least partially, especially predominantly or completely, of a stainless steel, especially an austenitic stainless steel.

Figure 4B:
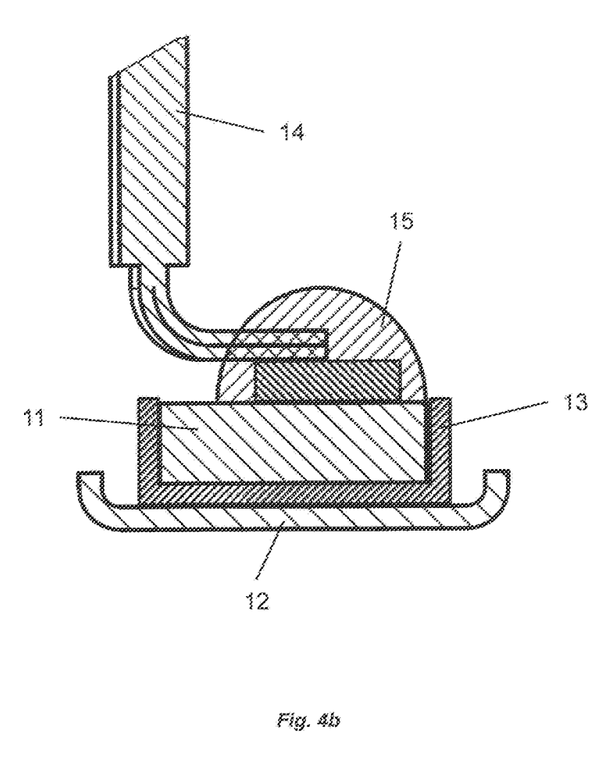
FIG. 4b shows in a sectioned, side view, another example of an embodiment for a sensor assembly of the present disclosure.

Coupling body 13 can, in turn, be, for example, a block or a formed part of metal and/or a plastic as highly heat conducting as possible. Advantageously, the coupling body 13 can, additionally, also be created insitu, namely in the course of forming the sensor assembly, for example, in that the temperature detector 11 and the support element 12 are soldered, or adhered, such that the coupling body 13 is the solder or adhesive. Furthermore, the coupling body 13 can also be so embodied and arranged that it, as indicated in FIG. 4b, at least partially surrounds the temperature detector 11, or such that temperature detector 11 is embedded at least in the coupling body 13.

Temperature detector 11 and coupling body 13 are, as well as also evident from FIGS. 1a and 1b, arranged together on a first surface 12+ of the support element 12. A second surface 12# of the support element 12 opposite the surface 12+, for example, a second surface at least in certain regions planparallel thereto, is, additionally, provided for contacting the above-mentioned tube 2, at least in certain regions. Coupling body 13 is connected also with the support element 12, especially with the middle segment 12a of the support element 12, by material bonding to form a coupling body to support element, connection zone. In an additional embodiment of the invention, it is, furthermore, provided that the surface 12+ of the support element 12 is planar, at least in the region of the coupling body to support element, connection zone, and/or that the surface 12# of the support element 12 is planar, at least in the region of the coupling body to support element, connection zone, for example, in such a manner that the surfaces 12+, 12# of the support element 12 are planparallel, at least in the region of the coupling body to support element, connection zone.

Figure 5:
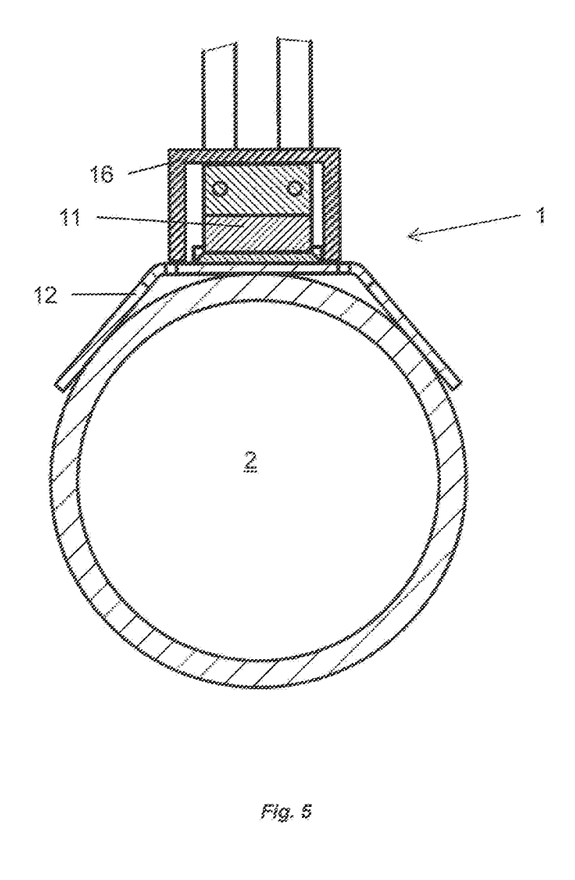
FIG. 5 shows in a sectioned, side view, another example of an embodiment for a sensor assembly of the present disclosure, and a transducer apparatus formed therewith.

In an additional embodiment of the invention, the sensor assembly comprises, such as also indicated in FIGS. 1a and 1b, and evident from their combination, a pair of connection wires 14, for example, in the form of copper-wires and/or silver-wires, electrically connected with the temperature detector 11; this occurs especially in such a manner that the connecting locations of the connection wires 14 formed with the conductive trace 112 are each located on the previously mentioned support 111. The connection wires 14 can, for example, be connected with the conductive trace 112 by material bonding before the mentioned joining together of support element 12 and temperature detector 11, in given cases, even during the manufacture of the temperature detector 11. For additional improvement of the mechanical stability, not least of all also vibration resistance of the sensor assembly, such comprises, according to an additional embodiment of the invention, furthermore, a protective cover layer 15 at least partially covering both the temperature detector 11 as well as also the above-mentioned pair of connection wires 14. The protective cover layer 15 can, for example, be connected by material bonding with the temperature detector 11 and/or the connection wires 14 and be composed, at least partially, of a plastic, for instance, a silicone and/or an epoxide resin. Additionally, the protective cover layer 15 can be so embodied and positioned that it covers the temperature detector 11 and the pair of connection of wires 14 within a shared contact region, for example, covering the above described connecting locations of the connection wires 14 with the conductive trace 112. Alternatively or supplementally to the protective cover layer 15, the sensor assembly can be provided, furthermore, with a retaining bracket 16 for improving mechanical stability. The retaining bracket 16 is connected by material bonding with the support element 12, equally as well surrounds the temperature detector 11, for example, holds the temperature detector pressed against the support element. Retaining bracket 16 can be produced, for example, of a metal and/or be of the same material as the support element 12 and, as well as also shown schematically in FIG. 5, be secured to the middle segment 12a of the support element 12, for example, after the temperature detector 11 has been placed thereon.

As already mentioned, the sensor assembly 1 of the invention is, especially, provided as a component of a transducer apparatus to be used for the measurement of at least one measured variable, wherein the transducer apparatus comprises as an additional component a tube 2 serving for conveying the fluid. Tube 2 has a lumen 22 surrounded by a, for example, metal, wall 21 and can, as well as also shown in FIG. 3a, be embodied hollow cylindrically, at least in certain regions, and/or be adapted to convey in the aforementioned lumen the fluid to be measured, for example, a fluid supplied and drained via a pipeline connected thereto. The wall 21 of the tube 2 can advantageously be at least partially, for example, also predominantly or completely, of a stainless steel, e.g. an austenitic stainless steel. In an additional embodiment of the invention, the tube 2 is, furthermore, adapted to convey the flowing fluid in the lumen 22 and during that to be caused to vibrate.

In the case of the transducer apparatus of the invention, the support element 12 of the sensor assembly 1 is—, as well as also directly evident in FIGS. 3a, and 3b, individually or in combination—arranged on a surface 21+ of the wall 21 of the tube 2 remote from the lumen, especially in such a manner that the support element 12 of the sensor assembly 1 contacts the wall 21 of the tube 2, at least in certain regions—, as well as also directly evident in FIGS. 3a, and 3b, or from a combination of FIGS. 1a, 1b, 3a and 3b—with the second surface 12# opposite the surface 12+ of the support element 12. Support element 12, or the sensor assembly 1 formed therewith, can be positioned, for example, on a curved, especially also arc shaped, segment of the wall 21 or—, as well as also indicated in FIG. 3a—on a hollow cylindrical, consequently straight, segment of the wall 21. Additionally, the support element 12 is—such as also indicated in FIG. 3a—at least in selected regions 100 connected by material bonding with the wall 21 of the tube 2, for example, welded and/or soldered to the wall 21. Support element 12 and wall 21 can advantageously, additionally, be, at least partially, for example, also predominantly or completely, of the same material, for example, the same stainless steel.

In an additional embodiment of the invention, the support element 12 is so embodied and so arranged on the tube 2 that the middle segment 12a and/or the end segment 12b and/or the end segment 12c of the support element contact the wall 21 of the tube; this, especially, in such a manner that the middle segment contacts the wall in the region of the above described coupling body to support element, connection zone, and forms a middle segment to tube, contact zone. In such case, the support element 12 of the sensor assembly 1 placed on the tube 2 can have—, as well as also directly evident from FIGS. 3a and 3b, and their combination—an installed form, for example, a clamp like form, differing from the starting form shown in FIGS. 1a, 1b and 2, thus differing, for example, from a form corresponding to a state for delivery; this especially in such a manner that the surface 12+ of the support element within a region extending from its end segment 12b extends to its end segment 12c is convex and/or that the surface 12# of the support element 12 is concave within a region extending from its end segment 12b to its end segment 12c. As evident from FIG. 3b, or from a combination of FIGS. 3a and 3b, the support element 12 can, in such case, then be formed such that both the end segment 12b and the middle segment 12a of the support element as well as also the end segment 12c and the middle segment 12a of the support element enclose, in each case, an, especially equally large, angle of less than 180° and greater than 90°. Alternatively or supplementally, it is, furthermore, provided that the middle segment 12a of the support element contacts the wall of the tube—as well as also indicated in FIG. 3b—only tangentially and/or that the end segment 12b and/or the end segment 12c contact the wall 21 2-dimensionally.

Figure 6:
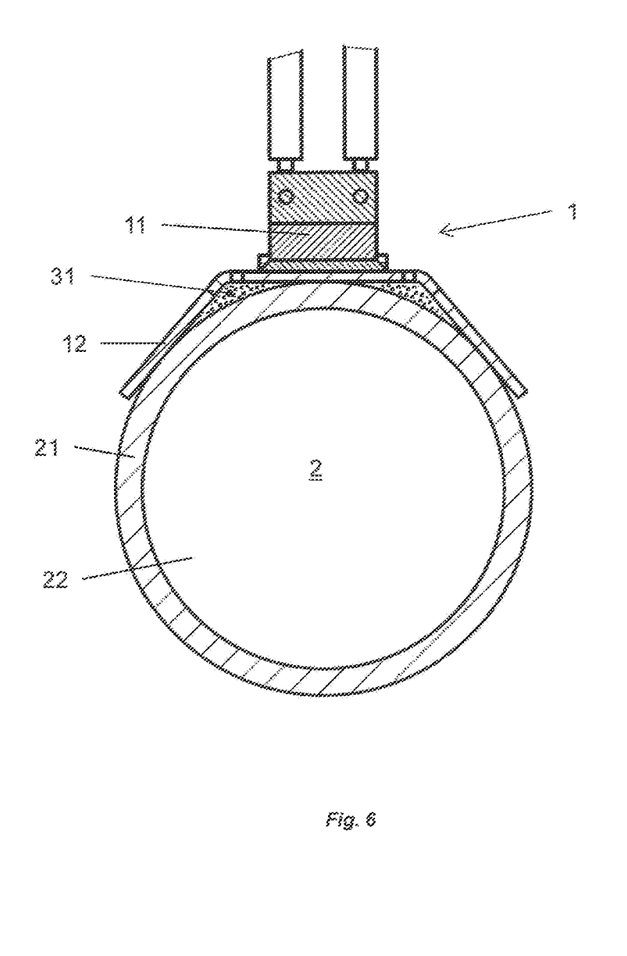
FIG. 6 shows in a sectioned, side view, another example of an embodiment for a transducer apparatus of the present disclosure.

In an additional embodiment of the invention,—as well as also indicated in FIG. 3a at location 100—additionally, the end segment 12b of the support element 12 and the wall 21 of the tube 2 are welded together, for example, welded by means of resistance—, or spot, welding and/or the end segment 12c of the support element 12 and the wall 21 of the tube 2 are welded together, especially by means of resistance—, or spot welding; this, especially, in such a manner that the middle segment 12a of the support element 12 is not connected by material bonding with the wall of the tube, and only the two previously indicated end segments 12b, 12c of the support element 12 are connected by material bonding with the wall 21 of the tube 2. Particularly for this case, a heat conductive paste can be applied at least between the middle segment of the support element and the wall of the tube for improving the thermal coupling in the region of the middle segment to-tube contact zone. Alternatively, the middle segment 12a and the wall 21 can, as well as also indicated in FIG. 6, also be connected together by material bonding, for example, by means of a soldered connection or by means of a thermally conductive adhesive 3.

The transducer apparatus of the invention can be produced very simply, for example, by positioning a sensor assembly of the invention on a tube 2 in such a manner that, firstly, the end segment 12b is placed on the wall 21 of the tube 2 and there connected with the wall 2 by material bonding, for example, by means of resistance welding, and, thereafter, also the—firstly, still free—end segment 12c is correspondingly placed against the wall 21 of the tube 2—especially permanently, or to form the above described middle segment to tube, contact zone—and there equally connected with the wall 2 by material bonding, for example, likewise by means of resistance welding. Advantageously, in such case, also a sensor assembly 1 with a support element 12 left, firstly, in the original, starting form can be used, for example, with a form as shown in FIGS. 1a, 1b, and 2, wherein the final installed form shown in FIGS. 3a and 3b is brought about essentially during the connecting of sensor assembly 1 and tube 2.

In order also in the case of series production with manually executed final mounting of the sensor assembly on the tube to assure regularly an as defined as possible contact formation between tube and sensor assembly, not least of all also within the above described middle segment to tube, contact zone, equally as well, to enable an as simple as possible handling of the sensor assembly in the case of the sensor assembly of the invention, or the transducer apparatus formed therewith, the support element 12 is, especially, so embodied that a smallest bending stiffness $EI_{12a}$, which its middle segment 12a has at least in the region of the above described coupling body to support element, connection zone, is greater than a smallest bending stiffness $EI_{12}$, which the support element 12 has as a whole, or that the smallest bending stiffness $EI_{12a}$ of the middle segment 12a is greater than a smallest bending stiffness $EI_{12b}$, which the end segment 12b has, and/or than a smallest bending stiffness $EI_{12c}$, which the end segment 12c has. In this way, it can be assured in very simple, equally as well, effective manner that, on the one hand, the support element 12 can also be manually converted during the final mounting of the sensor assembly 1 on the tube 2 from its starting form into the above-mentioned final installed form, and, on the other hand, the coupling body to support element, connection zone especially critical for the long term stability of the sensor assembly, or the transducer apparatus formed therewith, is kept free of excessive mechanical stresses, namely stresses harmful for the sensor assembly 1. In an additional embodiment of the invention, the end segment 12b and/or the end segment 12c are/is adapted to be plastically deformed, especially bent, as a result of a bending force introduced therein, in each case, away from the middle segment 12a, and the middle segment 12a is adapted not to be plastically deformed as a result of a bending force introduced into the end segment 12b and/or in the end segment 12c, and plastically deforming the end segments 12b and 12c. The relations of the invention for the above described bending stiffnesses EI$_{12}$, EI$_{12a}$, EI$_{12b}$, EI$_{12c}$ can be provided—as well as also schematically shown in FIG. 2—in very simple manner by weakenings 12' 12", for example, in the form of holes, bores and/or elongated depressions correspondingly provided in the support element.

The invention claimed is:

1. A sensor assembly, comprising:
a temperature detector;
a monolithic, metal, support element for holding the temperature detector and having a middle segment, a first end segment adjoining a first end of the middle segment, and a second end segment adjoining a second end of the middle segment remote from the first end; and
a coupling body coupling the temperature detector thermally conductively with the support element;
wherein the temperature detector and the coupling body are connected together by material bonding and are arranged together on a first surface of the support element;
wherein the coupling body is connected with the support element by material bonding to form a coupling body to support element connection zone; and
wherein a smallest bending stiffness, which the middle segment has at least in the region of the coupling body to support element connection zone, is greater than a smallest bending stiffness, which the support element has, as a whole, and/or greater than a smallest bending stiffness, which the first end segment has, and/or greater than a smallest bending stiffness, which the second end segment has.

2. The sensor assembly of claim 1, wherein the first end segment and/or the second end segment are adapted to be plastically deformed as a result of a bending force introduced therein away from the middle segment; and wherein the middle segment is adapted not to be plastically deformed as a result of a bending force introduced into the first end segment or the second end segment.

3. The sensor assembly of claim 1, wherein the first end segment and the second end segment are adapted, as a result of a bending force introduced therein, to be deformed away from the middle segment such that the first end segment and the middle segment as well as the second end segment and the middle segment enclose an angle of less than 180 degrees and greater than 90 degrees and/or the first surface is convex within a region extending from the first end segment to the second end segment.

4. The sensor assembly of claim 1, wherein the support element is composed of a stainless steel.

5. The sensor assembly of claim 1, wherein the temperature detector includes a support; and wherein a conductive trace is arranged on the support.

6. The sensor assembly of claim 5, wherein the temperature detector has a protective cover layer at least partially covering at least the conductive trace; and
wherein the temperature detector has a metallized layer on a side of the support not supporting the at least one conductive trace.

7. The sensor assembly of claim 1, further comprising a pair of connection wires electrically connected with the temperature detector.

8. The sensor assembly of claim 7, further comprising a protective cover layer at least partially covering both the temperature detector as well as also the pair of connection wires.

9. The sensor assembly of claim 1, further comprising a retaining bracket connected by material bonding with the support element, wherein the retaining bracket surrounds the temperature detector and holds the temperature detector pressed against the support element.

10. The sensor assembly of claim 1, wherein the temperature detector is adapted to register a temperature at a temperature measurement location and to transduce such into a temperature measurement signal.

11. The sensor assembly of claim 1, wherein the temperature detector is formed using a platinum measuring resistor.

12. The sensor assembly of claim 1, wherein the temperature detector is formed using a thermistor.

13. The sensor assembly of claim 1, wherein the temperature detector is formed by means of a thermocouple.

14. A transducer apparatus, comprising:
a tube having a lumen surrounded by a wall, which is hollow and cylindrical and/or curved; and
a sensor assembly, including:
a temperature detector;
a monolithic, metal, support element for holding the temperature detector and having a middle segment, a first end segment adjoining a first end of the middle segment, and a second end segment adjoining a second end of the middle segment remote from the first end;
and
a coupling body coupling the temperature detector thermally conductively with the support element;
wherein the temperature detector and the coupling body are connected together by material bonding and are arranged together on a first surface of the support element;
wherein the coupling body is connected with the support element by material bonding to form a coupling body to support element connection zone; and
wherein a smallest bending stiffness, which the middle segment has at least in the region of the coupling body to support element connection zone, is greater than a smallest bending stiffness, which the support element has, as a whole, and/or greater than a smallest bending stiffness, which the first end segment has, and/or greater than a smallest bending stiffness, which the second end segment has;
wherein the support element of the sensor assembly is arranged on the lumen-far surface of the wall of the tube and connected with the wall by material bonding.

15. The transducer apparatus of claim 14, wherein the tube is adapted to convey a fluid flowing at least at times in its lumen.

16. The transducer apparatus of claim 14, wherein the tube is adapted to convey a fluid flowing at least at times in its lumen and during that to be caused to vibrate.

17. The transducer apparatus of claim 14, wherein the support element of the sensor assembly contacts the wall of the tube with a second surface opposite the first surface of the support element.

18. The transducer apparatus of claim 17, wherein the second surface of the support element is concave within a region extending from its first end segment to its second end segment.

19. The transducer apparatus of claim 14, wherein both the first end segment and the middle segment of the support element as well as also the second end segment and the middle segment of the support element enclose an angle of less than 180 degrees and greater than 90 degrees; and/or wherein the first surface of the support element is convex within a region extending from its first end segment to its second end segment.

20. The transducer apparatus of claim 14, wherein at least one of the following:
the support element is arranged on a hollow cylindrical segment of the wall;
wherein the support element contacts the wall of the tube;
wherein the wall of the tube is composed of a stainless steel;
wherein the support element and the wall of the tube are composed of equal materials;
wherein the first end segment of the support element and the wall of the tube are welded together;
wherein the second end segment of the support element and the wall of the tube are welded together;
wherein the support element is embodied clamp like;
wherein the first surface of the support element is planar;
wherein the middle segment of the support element contacts the wall of the tube only tangentially;
wherein the first end segment of the support element contacts the wall of the tube 2-dimensionally; and
wherein the second end segment of the support element contacts the wall of the tube 2-dimensionally.

21. The transducer apparatus of claim 20, wherein the middle segment of the support element contacts the wall of the tube to form a middle segment to tube, contact zone; and/or wherein a heat conductive paste and/or a thermally conductive adhesive is applied at least between the middle segment of the support element and the wall of the tube; and/or wherein the middle segment of the support element and the wall of the tube are soldered together.

22. The transducer apparatus of claim 14, wherein only the first and second end segments of the support element are connected with the wall of the tube by material bonding.

23. A measuring system for measuring at least one measured variable, comprising:
a tube having a lumen surrounded by a wall, which is hollow and cylindrical and/or curved;
a sensor assembly, including:
a temperature detector;
a monolithic, metal, support element for holding the temperature detector and having a middle segment, a first end segment adjoining a first end of the middle segment, and a second end segment adjoining a second end of the middle segment remote from the first end;
and
a coupling body coupling the temperature detector thermally conductively with the support element;
wherein the temperature detector and the coupling body are connected together by material bonding and are arranged together on a first surface of the support element;
wherein the coupling body is connected with the support element by material bonding to form a coupling body to support element connection zone; and
wherein a smallest bending stiffness, which the middle segment has at least in the region of the coupling body to support element connection zone, is greater than a smallest bending stiffness, which the support element has, as a whole, and/or greater than a smallest bending stiffness, which the first end segment has, and/or greater than a smallest bending stiffness, which the second end segment has;
wherein the support element of the sensor assembly is arranged on the lumen-far surface of the wall of the tube and connected with the wall by material bonding; and
a measuring- and operating electronics connected with the temperature detector.

24. A method for producing a transducer apparatus, comprising:
providing a sensor assembly and tube;
wherein the tube includes a lumen surrounded by a wall, which is hollow and cylindrical and/or curved; and
wherein the sensor assembly includes:
a temperature detector;
a monolithic, metal, support element for holding the temperature detector and having a middle segment, a first end segment adjoining a first end of the middle segment, and a second end segment adjoining a second end of the middle segment remote from the first end;
and
a coupling body coupling the temperature detector thermally conductively with the support
wherein the temperature detector and the coupling body are connected together by material bonding and are arranged together on a first surface of the support element;
wherein the coupling body is connected with the support element by material bonding to form a coupling body to support element connection zone; and
wherein a smallest bending stiffness, which the middle segment has at least in the region of the coupling body to support element connection zone, is greater than a smallest bending stiffness, which the support element has, as a whole, and/or greater than a smallest bending stiffness, which the first end segment has, and/or greater than a smallest bending stiffness, which the second end segment has;
wherein the support element of the sensor assembly is arranged on the lumen-far surface of the wall of the tube and connected with the wall by material bonding;
applying the first end segment of the support element on the wall of the tube;
material bonded connecting of the first end segment of the support element with the wall of the tube;
applying the second end segment of the support element on the wall of the tube; and
material bonded connecting of the second end segment of the support element with the wall of the tube.

* * * * *